United States Patent
Morley et al.

(10) Patent No.: US 7,004,374 B2
(45) Date of Patent: Feb. 28, 2006

(54) PROCESS OF MAKING A SHAPED PRODUCT

(75) Inventors: Ed Morley, Toftlund (DK); James Steven Taylor, Rochdale (GB)

(73) Assignee: Norsk Hydro ASA, Oslo (NO)

( * ) Notice: Subject to any disclaimer, the term of this patent is extended or adjusted under 35 U.S.C. 154(b) by 0 days.

(21) Appl. No.: 10/476,399

(22) PCT Filed: May 2, 2002

(86) PCT No.: PCT/EP02/04948

§ 371 (c)(1),
(2), (4) Date: Apr. 12, 2004

(87) PCT Pub. No.: WO03/037559

PCT Pub. Date: May 8, 2003

(65) Prior Publication Data

US 2004/0164125 A1  Aug. 26, 2004

(30) Foreign Application Priority Data

May 2, 2001  (WO) .................. PCT/EP01/04981

(51) Int. Cl.
*B23K 1/20* (2006.01)
*B23K 31/02* (2006.01)

(52) U.S. Cl. ............... 228/207; 228/173.1; 228/173.6; 228/182; 228/223

(58) Field of Classification Search ........... 228/173.1, 228/173.3, 173.4, 181–183, 262.5, 262.51
See application file for complete search history.

(56) References Cited

U.S. PATENT DOCUMENTS

| | | | | |
|---|---|---|---|---|
| 3,053,693 | A | * | 9/1962 | Schuster et al. ............ 428/341 |
| 3,778,586 | A | * | 12/1973 | Breton et al. ............ 219/76.12 |
| 4,790,623 | A | * | 12/1988 | Winter et al. ............... 385/109 |
| 5,096,755 | A | * | 3/1992 | Nakagawa et al. ........ 428/35.5 |
| 5,851,719 | A | * | 12/1998 | Takei et al. ................. 430/126 |
| 6,648,212 | B1 | * | 11/2003 | Seseke-Koyro et al. .... 228/208 |

* cited by examiner

*Primary Examiner*—Lynne R. Edmondson
(74) *Attorney, Agent, or Firm*—Hartman & Hartman; Gary M. Hartman; Domenica N. S. Hartman

(57) ABSTRACT

A process of making a shaped product consisting of aluminium or an aluminium alloy comprising the steps of producing an intermediate object by extrusion or rolling and having at least one flat surface, coating the at least one flat surface with a brazing flux retaining coating which is composed of flux particles and a binder containing at least 10% by weight of a synthetic resin based, as its main constituent, on methacrylate homopolymer or a methacrylate copolymer, reshaping of the intermediate object into the shaped product and heating the shaped product to a temperature sufficient to provide at least one brazed connection between defined parts of the shaped products.

20 Claims, 2 Drawing Sheets

PROCESS OF MAKING A SHAPED PRODUCT

CROSS REFERENCE TO RELATED APPLICATIONS

This application claims the benefit of International Application No. PCT/EP02/04948 filed May 2, 2002, having a priority claim to International Application No. PCT/EP01/04981 filed May 2, 2001.

BACKGROUND OF THE INVENTION (1) Field of the Invention

The invention relates to a process of making a shaped product consisting of aluminum or an aluminum alloy, comprising the steps of producing an intermediate object by extrusion or rolling and reshaping the intermediate object into the shaped product.

(2) Description of the Related Art

Such a process is generally known and is used for producing different types of tubing such as wrapped tubes, folded tubes or so-called welded tubes.

For a number of such shaped products it is required to interconnect different portions of the shaped product in order to obtain a sealed construction, such as e.g. required for tubing, or to obtain the required strength such as e.g. required in folded tubes. This is commonly done by brazing. If such connection is required it becomes necessary to at least provide the surface of one portion to be brazed with a flux coating.

All known flux coatings, however, have the disadvantage that they have to be applied after the reshaping of the intermediate object into the shaped product. These known flux coatings are generally brittle and/or lack the adherence to the aluminum surface to withstand the deformation forces while reshaping the intermediate object. Therefor the common flux coating will partly spring off from the aluminum surface while reshaping, and this especially in these areas where deformation occurs.

BRIEF SUMMARY OF THE INVENTION

The present invention provides a process in which a flux coating is applied before deformation/bending of an intermediate object to form a shaped product. This object is obtained by means of a process that involves providing an intermediate object having at least one flat surface, and then coating the at least one flat surface with a flux retaining coating that comprises flux particles and a binder containing at least 10% by weight of synthetic resin that has, as its main constituent, a methacrylate homopolymer or a methacrylate copolymer. The intermediate object is then reshaped into the shaped product, which is then heated to a temperature sufficient to provide at least one brazed connection between defined parts of the shaped products.

In this way it becomes possible to apply the flux coating by means of a simple coating process, which is technically simple compared with the known application techniques, and which can easily be adapted to such an extent as that the coating is only applied to the positions needed for the brazing The type of brazing flux is not a limiting factor in this process, as any type of flux coating can be used.

The invention is also not restricted to one type of product but different types of products can be made.

BRIEF DESCRIPTION OF THE DRAWINGS

Further characteristics and advantages of the invention will become clear from the following description, references being made to the annexed drawings in which.

DETAILED DESCRIPTION OF THE INVENTION

Figure 1:
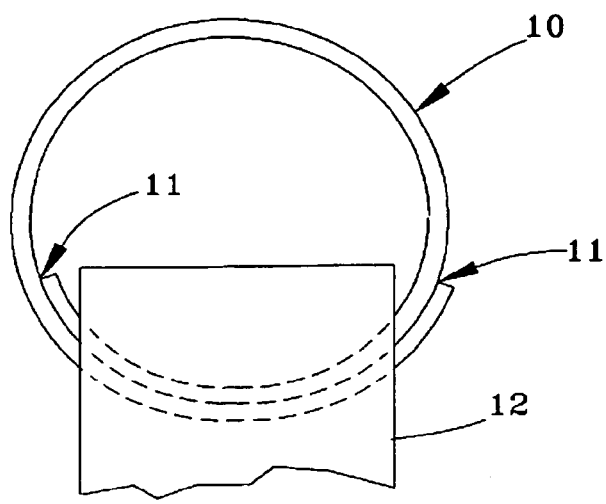
FIG. 1 is a schematic cross-sectional view of a tube, made in accordance with the invention.

In FIG. 1 there is shown a so-called wrapped tube 10. This wrapped tube 10 has been obtained by producing a flat shaped object by e.g. rolling, and subsequently bending this flat object so as to obtain a substantially cylindrical shape with overlapping side portions 11. According to the invention at least one part of the overlapping side portions 11 has been coated with a brazing flux containing coating comprising flux particles and a binder containing at least 10% by weight of synthetic resin that has, as its main constituent, a methacrylate homopolymer or a methacrylate copolymer. The brazing flux containing coating is preferably applied while the object is in its flat shape, so that the coating can be applied in a very simple way by means of conventional coating systems, such as e.g. described in PCT/EP99/09162. In case the wrapped tube is intended to be used as a header tube or manifold in a heat exchanger it is possible to provide the side portions of the flat shaped object with recesses or cut-outs, which after shaping into a wrapped tube form holes for the end portions of heat exchanging tubes 12. Also for this purpose the outer wall portion of the zone 11 may be coated before bending with a brazing flux retaining coating. When subsequently the obtained tube to and if present the inserted heat exchanging tubes 12 are placed in a brazing oven, or the like, no additional flux application is required and a brazed connection between the overlapping side portions 11 and between the tubes 10 and 12 is directly obtained because of the presence of the braze flux containing coating.

Figure 2:
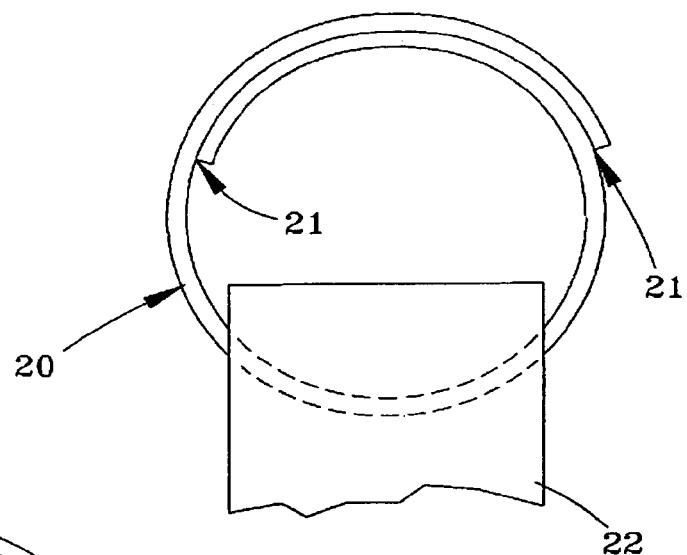
FIG. 2 is a schematic cross-sectional view of a modified embodiment of a tube made in accordance with the invention.

In FIG. 2 there is also shown a wrapped tube 20 corresponding substantially to the wrapped tube 10 shown in FIG. 1 and having overlapping side portions 21, which can be provided with a brazing flux retaining coating, so as to make brazing possible. In the embodiment shown in FIG. 2 the central part of the flat sheet forming the intermediate object is provided with a number of holes or piercings, which holes can accommodate end portions of heat exchanging tubes 22 after shaping the final product in this case a header tube 20 or manifold. At least the central portion of the flat sheet is also provided before deformation with a brazing flux retaining coating so that after shaping the manifold 20 and inserting the tubes 22, the brazing connection between the manifold 20 and the tubes can be made directly by heating without any further process step.

Figure 3:
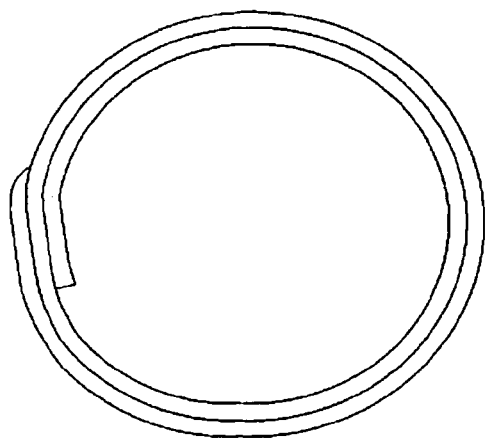
FIG. 3 is a schematic cross-sectional view of a third embodiment of a tube made in accordance with the invention.

In FIG. 3 there is shown a third embodiment of a wrapped tube obtainable by means of the process according to the invention. This type of tube may be especially useful in high pressure applications such as brake lines or hydraulic applications. The intermediate object is a flat sheet which at least at one side is provided with a braze flu retaining coating. Subsequently the flat sheet is wrapped to a cylindrical tube whereby a number of layers are formed so that the wall of the tube is thicker than the thickness of the flat sheet. Preferably two or more layers are formed, dependent upon the application of the final product. In a last step the wrapped tube is heated to a temperature above the required braze temperature, which is dependent upon the flux used whereby as a result of the presence of the flux retaining coating between the layers of the wrapped tube a firm connection between the successive layers can be obtained.

Figure 4:
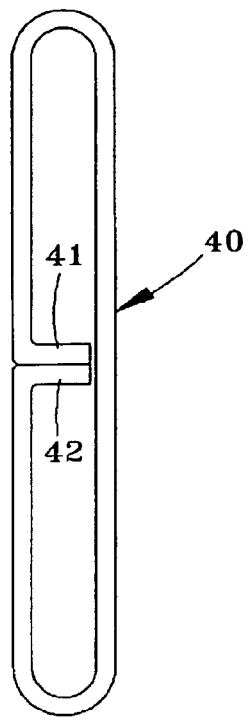
FIG. 4 is a schematic cross-sectional view of a so-called folded tube with multiple ports, made in accordance with the invention.
Figure 5:
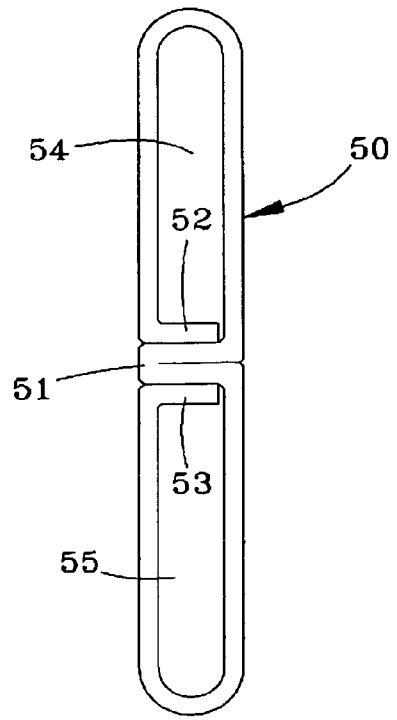
FIG. 5 is a schematic cross-sectional view of a modified embodiment of a folded tube.
Figure 6:
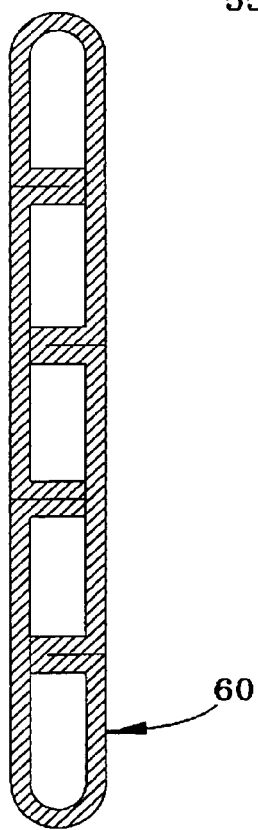
FIG. 6 is a schematic cross-sectional view of a third embodiment of a folded tube.

In the FIGS. 4, 5 and 6 there are shown different embodiments of so-called folded multiple port flat tubes. The intermediate objects for each of these tubes 40, 50 or 60 is a flat sheet of rectangular shape. After coating at least one side of the sheet with a brazing flux retaining coating the sheet is folded into the desired shape and subsequently heated in order to obtain the required brazed connections.

In FIG. 4 there must be provided at least a coating on the outer side of the tube 40, so as to enable end portions 41 and 42 to be connected and sealed by the brazing process. The embodiment of FIG. 5 requires a brazing flux retaining coating on both sides of the tube, but it may be limited to these portions where actual brazing is required. In this case this is the portion with the gusset fold 51 and the two end portions 52 and 53. In this way a sealing connection can be obtained between the gusset fold portion 51 and the end portions 52 and 53, so as to obtain two separate channels 54 and 55. Moreover, the strength of the tube can be improved by having the two halves of the gusset fold 51 brazed together.

In FIG. 6 there is shown how in the same way starting from a flat sheet coated with a brazing flux retaining coating according to the invention a multiple port flat tube can be obtained by using gusset folds and brazing together of the relevant positions. In this way a tube 60 with five channels can be obtained, but it will be obvious that any other configuration can be obtained.

Figure 7:
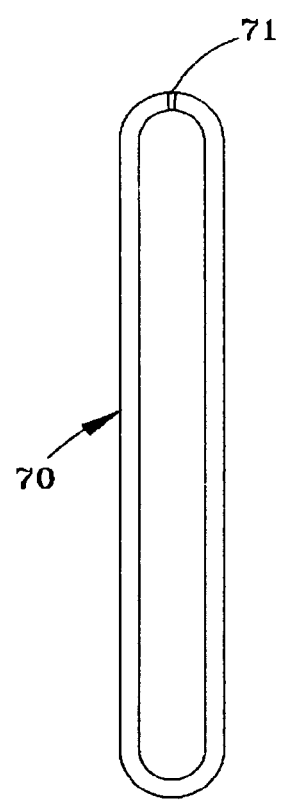
FIG. 7 is a schematic cross-sectional view of a so-called welded tube produced in accordance with the invention.

In FIG. 7 there is shown a so-called welded tube 70 i.e. a tube which has been obtained by shaping two half-tubes, e.g. by extrusion, which on one end portion may be connected to each other. After reshaping a flat tube is obtained by welding together the two halves along a seam 71. The intermediate object may be the half-tube flat outer side wall of which may be provided with a brazing flux retaining coating, or the final welded tubes which on both flat sides may be provided with a brazing flux retaining coating. The end result is the same and the coating makes it possible to make a brazed connection between the tubes 70 and e.g. finstock. The process according to the invention even makes it possible to shape the tube in a serpentine way before the brazing but after the coating and to have the finstock then brazed to the tube.

As a coating use can be made either of what is called hereinafter a prebraze coating, i.e. a coating containing a flux or flux-producing compound and a brazing alloy or a composition producing a brazing alloy upon heating, or what is called hereinafter a preflux coating i.e. a coating containing only a flux or a flux producing compound, in which latter case the brazing alloy will be obtained either by using a clad Al-material, i.e. having a top-layer of an brazing alloy, the coating being provided on top of that clad material, or the coated Al-product is used in combination with a clad Al-material.

Examples of prebraze coatings are the so-called reactive fluxes as e.g. described in WO-A-01 38040, such as fluxes based upon $K_2SiF_6$. The coating may contain either 0–100% by weight of $K_2SiF_6$, or 0–100% by weight of $KZnF_3$ and/or 0–50% by weight of potassium fluoroaluminate. This type of coating can be applied to unclad aluminum material, whereupon the Si originating from the $K_2SiF_6$ provides the filler material and K, F and Al form potassium fluoroaluminates which act as the flux. This type of coating is especially suitable for fin to tube joints, but can be used in applications according to the invention.

Another type of prebraze coating is based upon a flux as is e.g. known as Nocolok Sil® which is a flux containing Si-particles. The Si-particles will provide the filler material and the Nocolok-flux will act in the conventional way. Also this type of coating can be used with unclad Al-material.

A third type of prebraze coating can consist of a flux based upon potassium fluoroaluminate such as Nocolok® combined with powder of an Al—Si-alloy such as e.g. AA4047, AA4045 and the like. The Al—Si-particles will provide the filler material and the flux will act in the conventional way. Also this type of coating will be used together with unclad Al-material.

As examples for a preflux coating the following compositions can be named.

The combination of Nocolok® with ordinary fluxes such as potassium-fluoro-aluminates. This type of coating must either be applied to a clad Al-material or be used together with another Al-product provided with a brazing clad.

Other flux types which e.g. can be used according to the invention as so-called preflux coatings are the following:

Potassium fluoroaluminates such as potassium tetrafluoroaluminate ($KAlF_4$), potassium pentafluoroaluminate ($K_5AlF_5$, $K_2AlF_5.H_2O$) and potassium hexafluoroaluminate ($K_3AlF_6$). Examples of such fluxes have been described in GB-A 1,438,955, U.S. Pat. No. 4,428,920, U.S. Pat. No. 3,951,328, U.S. Pat. No. 5,318,764 and U.S. Pat. No. 4,579,605.

Oxyfluoroaluminum such as $Al_2F4O$ and AlFO

Hydroxyfluoroaluminum such as $AlF_2(OH)$, $AlF_2(OH).H_2O$ and $AlF(OH)_2$

Fluoroborates such as potassium tetrafluoroborate ($KBF_4$) and sodium tetrafluoroborate ($NaBF_4$). Examples of such fluxes haven been described in GB-A 899,171, GB-A 1,007, 039 and U.S. Pat. No. 4,235,649.

Fluorozincates such as potassium trifluorozincate ($KZnF_3$), potassium tetrafluorozincate ($K_2ZnF_4$) caesium trifluorozincate ($CsZnF_3$) and caesium tetrafluorozincate ($Cs_2ZnF_4$). Examples of such fluxes haven been described in DE-A-19,913,111 and WO-A-99,48641.

Alkali metal fluorosilicates such as caesium hexafluorosilicate ($Cs_2SiF_6$), potassium hexafluorosilicate ($K_2SiF_6$), lithium hexafluorosilicate ($Li_2SiF_6$), rubidium hexafluorosilicate ($Rb_2SiF_6$), sodium hexafluorosilicate ($Na_2SiF_6$) and ammonium hexafluorosilicate ($(NH_4)_2SiF_6$). Examples of such fluxes haven been described in U.S. Pat No. 5,785,770, DE-A-19,636,897, U.S. Pat No. 5,985,233, U.S. Pat No. 6,019,8565, U.S. Pat No. 5,980,650 and WO-A-98,10887.

Alkali bimetal fluorosilicates such as potassium caesium hexafluorosilicate ($KCsSiF_6$), lithium caesium hexafluorosilicate ($LiCsSiF_6$), rubidium caesium hexafluorosilicate (RbCsSiF$_6$), rubidium potassium hexafluorosilicate (RbK-SiF$_6$) and ammonium caesium hexafluorosilicate (NH4CsSiF$_6$).

Alkali metal bifluorosilicates (also referred to as alkali metal hydrofluorosilicates) such as caesium hydrofluorosilicate (CsHSiF$_6$), potassium hydrofluorosilicate (KHSiF$_6$), lithium hydrofluorosilicate (LiHSiF$_6$) and ammonium hydrofluorosilicate (NH4HSiF$_6$).

Caesiumfluoroaluminate complexes such as caesium fluoride (CsF), caesium hexafluoroaluminate (Cs$_3$AlF$_6$), caesium tetrafluoroaluminate (CsAlF$_4$, CsAlF$_4$.H$_2$O) and caesium pentafluoroaluminate (Cs$_2$AlF$_5$, Cs$_2$AlF$_5$.H$_2$O). Examples of such fluxes haven been described in U.S. Pat. No. 4,670,067, U.S. Pat. No. 5,171,377 (both caesium fluoroaluminates and caesium fluorides), U.S. Pat. No. 5,806,752 (Caesium fluoride), U.S. Pat. No. 5,771,962 (Caesium fluoride) and U.S. Pat. No. 4,655,385 (both caesium fluoroaluminates and caesium fluorides).

Otherwise so-called superfluid fluxes can be used as well.

As for the synthetic resins to be used in the binder of the present invention, those mainly comprising a homopolymer of a methacrylate or a copolymer of two or more methacrylates are preferred. Given as specific examples of such a methacrylic acid ester are methyl methacrylate, ethyl methacrylate, propyl methacrylate, 2-methylpromyl methacrylate, n-butyl methacrylate, t-butyl methacrylate, 2-etylbexyl methacrylate, octyl methacrylate-isodecyl methacrylate, lauryl methacrylate, tridecyl methacrylate, stearyl methacrylate, cyclohexyl methacrylate, benzyl methacrylate, diethylaminoethyl methacrylate, 2-hydroxyethyl methacrylate, dimethylaminoethyl methacrylate, t-butylaminoethyl methacrylate, glycidyl methacrylate, metatera-hydrofurfuryl methacrylate, and the like.

The coating can be applied by different techniques, such as by means of a roll coating technique, whereupon the applied coating is heated and dried to evaporate the organic solvent in the mixed flux composition. Roll-transfer printing can also be used as an application method but roll coating is preferred since it offers superior control of the quality of the deposited layer.

Preferably the synthetic resin has a composition which volatilizes in the range of 200–400° C., preferably below 350° C.

In this way a coating is obtained the binder of which will evaporate at the temperatures normally used in the brazing process, so that the binder cannot negatively influence the characteristics of the obtained brazing joint.

In a most preferred embodiment the synthetic resin comprises at least 10% by weight of a resin commercially available as Polaroid B 48 of Rohm & Haas.

It has been found that this resin fulfils all requirements for a satisfying flux coating, especially with respect to ease of use while applying the coating. Moreover no hazardous or dangerous fumes are generated during the brazing process, and no negative influences have been found with respect to the environment.

Satisfactory results have been obtained when the weight ratio of the flux powders to the synthetic resin comprised within the flux compositions lies in the range from 9:1 to 1:2, preferably 9:1 to 3:2, and when the flux coating has been applied in quantities from 2–20 g/m$^2$, preferably 5–20 g/m$^2$, and contains free Si, Zn or Zn+Si in an amount of 1 to 7 g/m$^2$.

When the weight ratio of the reactive flux exceeds 9, adhesion of the composition to the aluminum material becomes insufficient and the coating tends to cause flaking, whereas at less than 3:2 the excessive proportion synthetic resin can harm the brazing atmosphere which alters braze characteristics and raises the cost.

It is obvious that the invention is not restricted to the above described embodiment but that numerous modifications can be applied without departing from the scope of the annexed claims.

What is claimed is:

1. A process of making a shaped product comprising the steps of:
   providing an intermediate object formed of aluminum or an aluminum alloy to have at least one flat surface
   coating the at least one flat surface with a flux composition to form a coating on the at least one flat surface, the flux composition comprising particles of a braze flux material and a binder containing at least 10% by weight of synthetic resin based, as its main constituent, on methacrylate homopolymer or a methacrylate copolymer, wherein the weight ratio of the braze flux material to the synthetic resin in the flux composition is in the range from 9:1 to 3:2,
   reshaping the intermediate object into the shaped product, and
   heating the shaped product to a temperature sufficient to provide at least one brazed connection between portions of the shaped product.

2. A process according to claim 1, wherein the reshaping step comprises a bending operation of at least one part of the flat surface of the intermediate object.

3. A process according to claim 1, wherein the reshaping step causes the at least one flat surface and the coating thereon to be deformed to yield a deformed portion to which the coating remains adhered.

4. A process according to claim 1, wherein the flux composition contains a pre-flux composition and is used in combination with a preclad material on the intermediate object.

5. A process according to claim 1, wherein the heating step causes the synthetic resin to volatilize.

6. A process according to claim 3, wherein the amount of flux material is selected in such a way that the coating contains an amount of free Si, Zn or Zn+Si within the range 1 to 7 g/m$^2$.

7. A process according to claim 1, wherein the flux material is based upon a fluoroaluminate compound.

8. A process according to claim 1, wherein the shaped product is a folded tube.

9. A process according to claim 1, wherein the shaped product is a welded tube.

10. A process according to claim 1, wherein the shaped product is a wrapped tube.

11. A process according to claim 10, wherein the shaped product is a manifold tube.

12. A process of making a tubular-shaped product comprising the steps of:
   producing an intermediate object by extruding or rolling aluminum or an aluminum alloy to have at least one flat surface;
   coating the at least one flat surface with a flux composition to form a coating on the at least one flat surface, the flux composition comprising particles of a flux material and a binder containing at least 10% by weight of synthetic resin based, as its main constituent, on methacrylate homopolymer or a methacrylate copolymer,
   reshaping the intermediate object into the tubular-shaped product so that the at least one flat surface and the coating thereon are deformed to yield a deformed portion to which the coating remains adhered, the coating being present between the deformed portion and a second portion of the tubular-shaped product; and heating the tubular-shaped product to a temperature sufficient to volatilize the synthetic resin and produce at least one brazed connection between the deformed and second portions of the tubular-shaped product.

13. A process according to claim 12, wherein the weight ratio of the flux material to the synthetic resin in the flux composition being in the range from 9:1 to 3:2.

14. A process according to claim 12, wherein the tubular-shaped product is a heat exchanger tube.

15. A process according to claim 12, wherein the tubular-shaped product is a heat exchanger manifold tube.

16. A process of making a tubular component of a heat exchanger, the process comprising the steps of:

providing an intermediate object formed of aluminum or an aluminum alloy to have at least one flat surface;

coating the at least one flat surface with a flux composition to form a coating on the at least one flat surface, the flux composition comprising particles of a braze flux material and a binder containing at least 10% by weight of synthetic resin based, as its main constituent, on methacrylate homopolymer or a methacrylate copolymer;

reshaping the intermediate object into a tubular object so that the at least one flat surface and the coating thereon are deformed to yield a deformed portion to which the coating remains adhered; and heating the tubular object to a temperature sufficient to volatilize the synthetic resin and provide at least one brazed connection between portions of the tubular object and thereby yield the tubular component.

17. A process according to claim 16, wherein the weight ratio of the flux material to the synthetic resin in the flux composition is in the range from 9:1 to 3:2.

18. A process according to claim 16, wherein the flux material contains free Si, Zn, or Zn+Si.

19. A process according to claim 16, wherein the tubular component is a heat exchanger tube.

20. A process according to claim 16, wherein the tubular component is a manifold tube.

* * * * *